US007819370B2

United States Patent
Ho

(10) Patent No.: US 7,819,370 B2
(45) Date of Patent: Oct. 26, 2010

(54) QUICK-RELEASE HANGING DEVICE

(76) Inventor: Cheng-I Ho, No. 13, Yong Yi Road, Tai-Ping City, Taichung Hsien (TW)

( * ) Notice: Subject to any disclaimer, the term of this patent is extended or adjusted under 35 U.S.C. 154(b) by 128 days.

(21) Appl. No.: 11/892,323

(22) Filed: Aug. 22, 2007

(65) Prior Publication Data

US 2008/0251670 A1  Oct. 16, 2008

(30) Foreign Application Priority Data

Apr. 11, 2007  (TW) .............................. 96205773 U

(51) Int. Cl.
*F16B 45/00* (2006.01)
(52) U.S. Cl. ............... 248/304; 248/222.52; 24/580.11; 224/197; 224/272
(58) Field of Classification Search ................ 248/304, 248/682, 690, 691, 692, 222.52, 223.31, 248/224.8, 221.11; 224/197, 199, 271, 272; 24/669, 580.11
See application file for complete search history.

(56) References Cited

U.S. PATENT DOCUMENTS

| 3,080,634 | A | * | 3/1963 | Lindblad | .................. 24/579.11 |
| 3,443,783 | A | * | 5/1969 | Fisher | .......................... 248/239 |
| 3,564,984 | A | * | 2/1971 | Alexander | .................. 359/551 |
| 3,743,147 | A | * | 7/1973 | Wilczynski | .................. 224/199 |
| 4,527,760 | A | * | 7/1985 | Salacuse | ..................... 248/108 |
| 4,641,807 | A | * | 2/1987 | Phillips | ...................... 248/480 |
| 4,982,981 | A | * | 1/1991 | Fourrey et al. | ........... 280/801.2 |
| 5,201,858 | A | * | 4/1993 | Otrusina | .................. 24/573.11 |
| 5,421,497 | A | * | 6/1995 | Gilmore | ..................... 224/198 |
| 5,551,611 | A | * | 9/1996 | Gilmore | ..................... 224/198 |
| 5,604,958 | A | * | 2/1997 | Anscher | ....................... 24/3.1 |
| 6,478,202 | B1 | * | 11/2002 | Glock | ......................... 224/198 |
| 6,685,067 | B2 | * | 2/2004 | French | ........................ 224/198 |
| 6,695,269 | B1 | * | 2/2004 | Anscher | ................ 248/225.11 |

* cited by examiner

*Primary Examiner*—Anita M King
(74) *Attorney, Agent, or Firm*—Rosenberg, Klein & Lee

(57) ABSTRACT

A quick-release hanging device includes a base and a detachable part. This base includes a first through hole and a second through hole. The first through hole has a first regular polygonal shape. The second through hole has a substantially round shape. The detachable part includes a movable portion, a hanger and a locking portion. The locking portion has a second regular polygonal shape that is relative smaller than and corresponding to the first regular polygonal shape. The locking portion is rotatable within the second through hole. It is easy to manufacture with low cost. The connected structure is quite solid. Moreover, its application scope is wide.

3 Claims, 8 Drawing Sheets

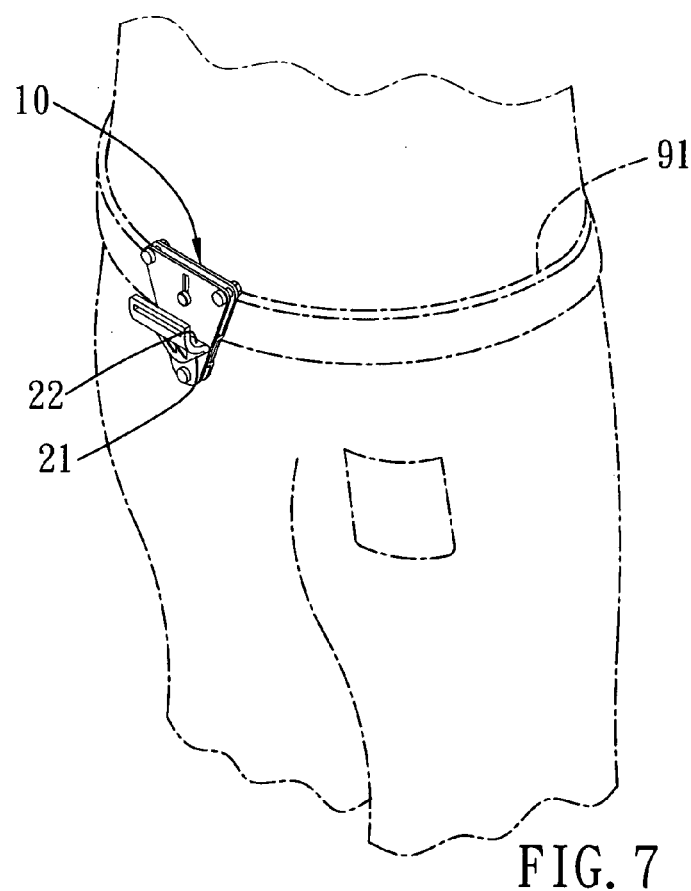
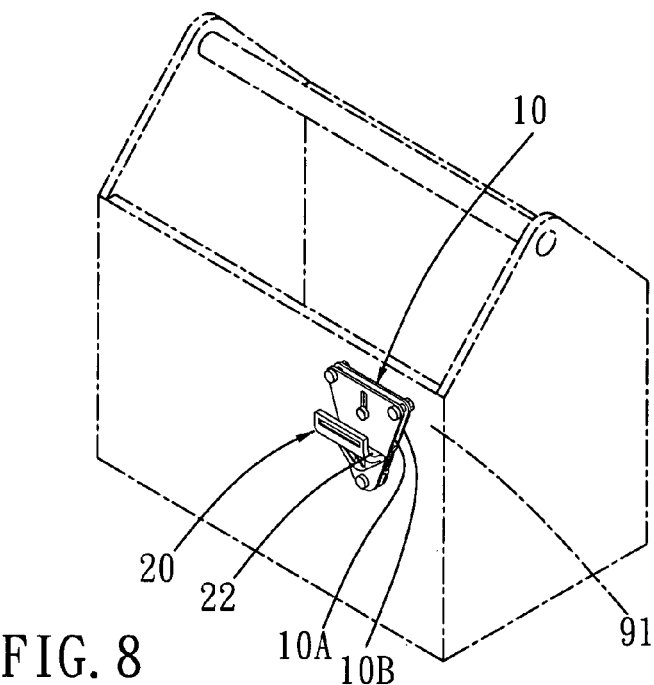

QUICK-RELEASE HANGING DEVICE

BACKGROUND OF THE INVENTION

1. Field of the Invention

The present invention relates to a quick-release hanging device. Particularly, it relates to a quick-release hanging device mounted on a tool container or the like. It is easy to manufacture with low cost. The connected structure is quite solid. Moreover, its application scope is wide.

2. Description of the Prior Art

About the conventional hanging devices (all not shown), if a user wants to hang something on a wall or on an object, this user usually uses a metal hanging structure (to adhere on, lock on, or nail on a wall). Although it can easily and quickly hang something on the metal hanging structure, the hanging condition is not very firm. In addition, it is hard to relocate the metal hanging structure.

If the above metal hanging structure is replaced by a plastic material, the cost could be lowered. But, it still has the problem that is not easy to relocate.

Another conventional hanging structure is shaped like a hook hanging a small hole of a worker's belt (especially for a construction worker). However, this kind of hook is not a quick-release design. So, the user can't take off this hook quickly.

Thus, it is needed to invent a new hanging device to overcome the above-mentioned problems and disadvantages.

SUMMARY OF THE INVENTION

The primary object of the present invention is to provide a quick-release hanging device. It is easy to manufacture with low cost.

The next object of the present invention is to provide a quick-release hanging device. In which, the connected structure is quite solid.

Another object of the present invention is to provide a quick-release hanging device. Its application scope is wide.

BRIEF DESCRIPTION OF THE DRAWINGS

FIG. 7 shows the second application mode of the present invention.

FIG. 8 illustrates the third application mode of the present invention.

DETAILED DESCRIPTION OF THE PREFERRED EMBODIMENT

Figure 1:
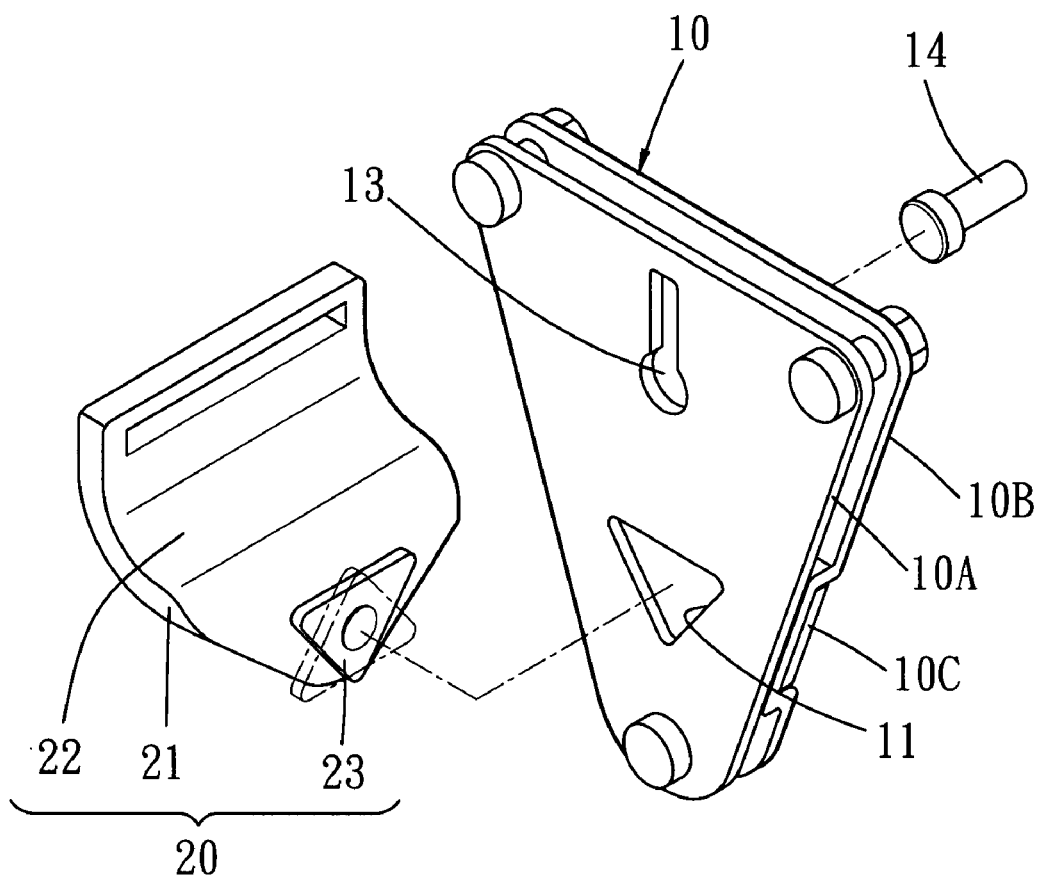
FIG. 1 is a perspective view of the present invention when it is disassembled.
Figure 2:
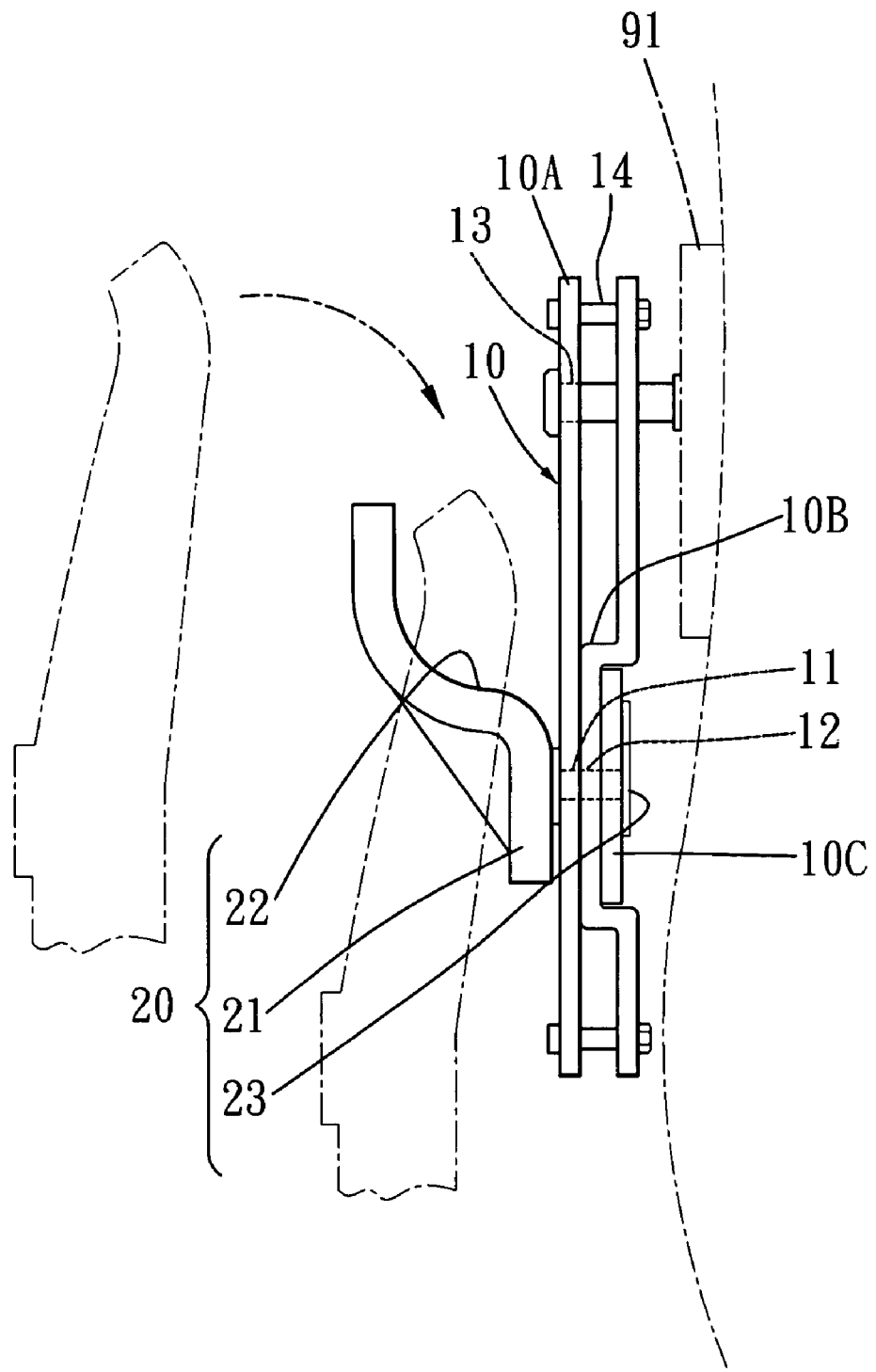
FIG. 2 is a side view of the present invention.
Figure 3:
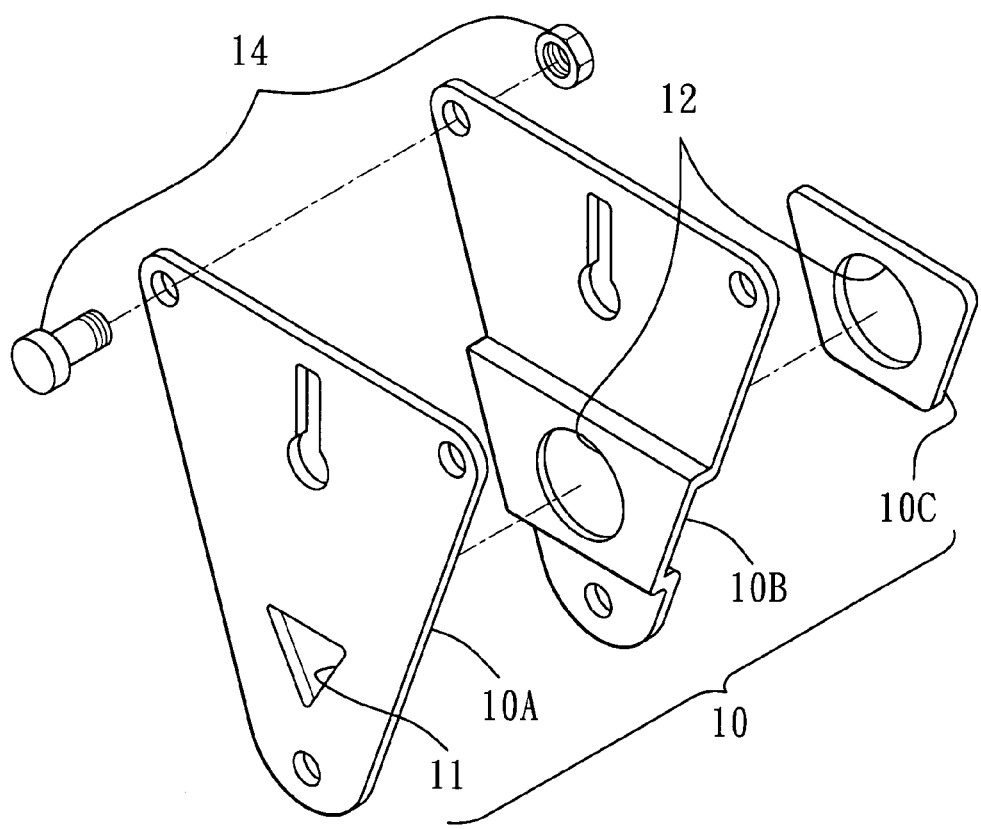
FIG. 3 is an exploded view showing a portion of the present invention.

Referring to FIGS. 1 to 3, the present invention is a quick-release hanging device. It mainly comprises a base 10 and a detachable part 20.

With regard this base 10, it includes a first through hole 11 and a second through hole 12. The first through hole 11 has a first regular polygonal shape. The second through hole 12 has a substantially round shape.

About this detachable part 20, it includes a movable portion 21, a hanger 22 and a locking portion 23. The locking portion 23 has a second regular polygonal shape that is relative smaller than and corresponding to the first regular polygonal shape. The locking portion 23 is rotatable within the second through hole 12.

Figures 4A, 4B:
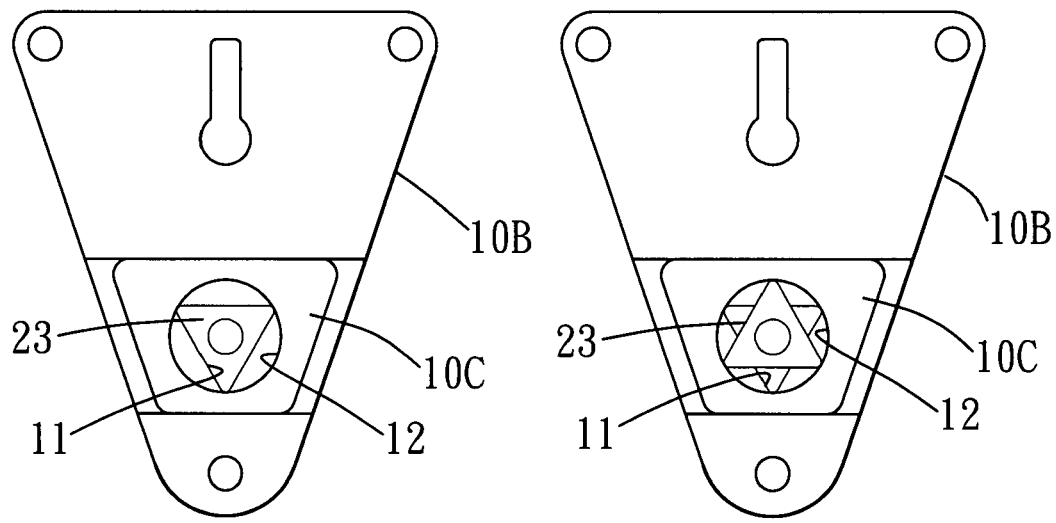
FIG. 4A shows the first embodiment of the present invention before locking.
FIG. 4B shows the first embodiment of the present invention after locking.

As illustrated in FIGS. 1, 2, 4A and 4B, this invention can be described below. The use takes the detachable part 20 to let the locking portion 23 (which has the second regular polygonal shape) pass the first through hole 11 (which has the first regular polygonal shape) and then stay within the space of the second through hole 12. After which, by slightly rotating the locking portion 23 about a certain angle, the locking portion 23 will be blocked by the first through hole 11. If the locking portion 23 is formed with the movable portion 21 as an integral structure, the user can rotate the movable portion 21 directly. Then, the detachable part 20 and the base 10 are locked together, as shown in FIGS. 2, 4A and 4B.

Figure 6:
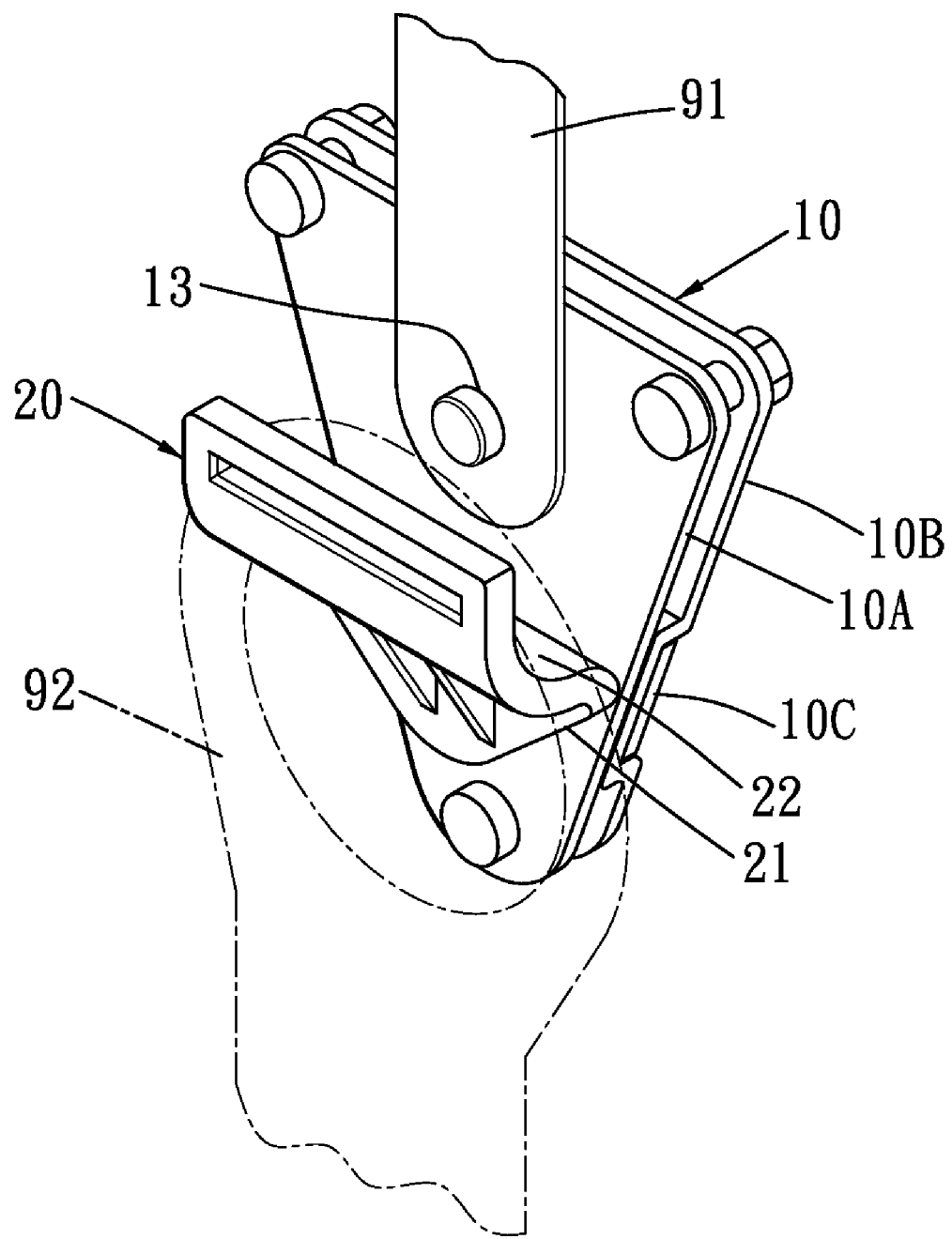
FIG. 6 shows the first application mode of the present invention.

Practically, the base 10 may include a first pressed plate 10A, a second pressed plate 10B, an auxiliary frame 10C, an application connecting hole 13, and a plurality of fixing assemblies 14. In addition, the first through hole 11 is formed on the first pressed plate 10A via a press machine. The second through hole 12 is formed on the second pressed plate 10B and the auxiliary frame 10C. The application connecting hole 13 permits this invention to connect with an application object 91. Concerning this application object 91, it can be selected from one of a belt (as exhibited in FIG. 2 and FIG. 7), a suspending element (as shown in FIG. 6), a tool container (as illustrated in FIG. 8).

The locking portion 23 is pivoted on the movable portion 21 so that it can rotate to desired angle. By doing so, the use takes the detachable part 20 to let the locking portion 23 (which has the second regular polygonal shape) pass the first through hole 11 (which has the first regular polygonal shape) and then stay within the space of the second through hole 12. After which, the user slightly rotating the locking portion 23 about a certain angle by one's fingers, the locking portion 23 will be blocked by the first through hole 11.

Figure 5:
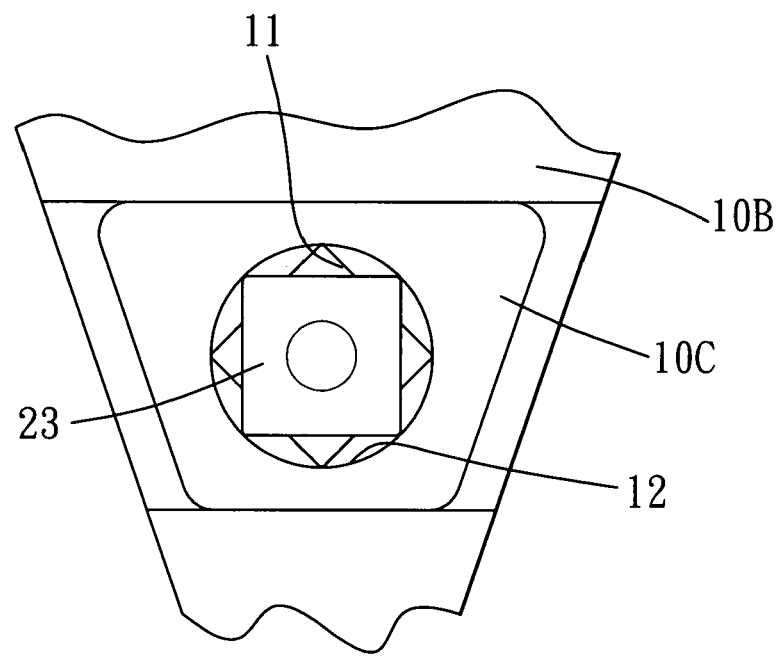
FIG. 5 illustrates the second embodiment of the present invention.

About the first regular polygonal shape of the first through hole 11, it can be a triangle (see FIGS. 1, 4A and 4B), square (as shown in FIG. 5), or the like Furthermore, regarding the second regular polygonal shape of the second through hole 12, it must be corresponding to the first regular polygonal shape. It also can be a triangle (see FIGS. 1, 4A and 4B), square (as shown in FIG. 5), or the like.

This invention at least includes the following application modes.

[a] As illustrated in FIGS. 2 and 7, the application connecting hole 13 connects to a belt (which is the application object 91). Under this condition, a tool (such as a wrench) can be hung on the hanger 22. It is very suitable for a worker who needs to walk abound with a tool. Furthermore, it is very easy to take off and replace another tool on the hanger 22.

[b] As shown in FIG. 8, the application connecting hole 13 connects with a tool container (which is the application object 91). In this case, a ruler or a small-size tool can be hung on the hanger 22 mounted the tool container.

[c] Referring to FIG. 6, the application connecting hole 13 connects with a suspending element (which is a application object 91) for permitting to hang a specific hanging object 92. This specific hanging object 92 could be in a studio (for hanging an article), in an automobile's repair shop (for hanging a repairing hand tool), in a kitchen (for hanging a knife, a soup spoon . . . ), in a bathroom (for hanging a towel or a cup), in an office, etc. Thus, this invention's application scope is very wide.

Figure 9:
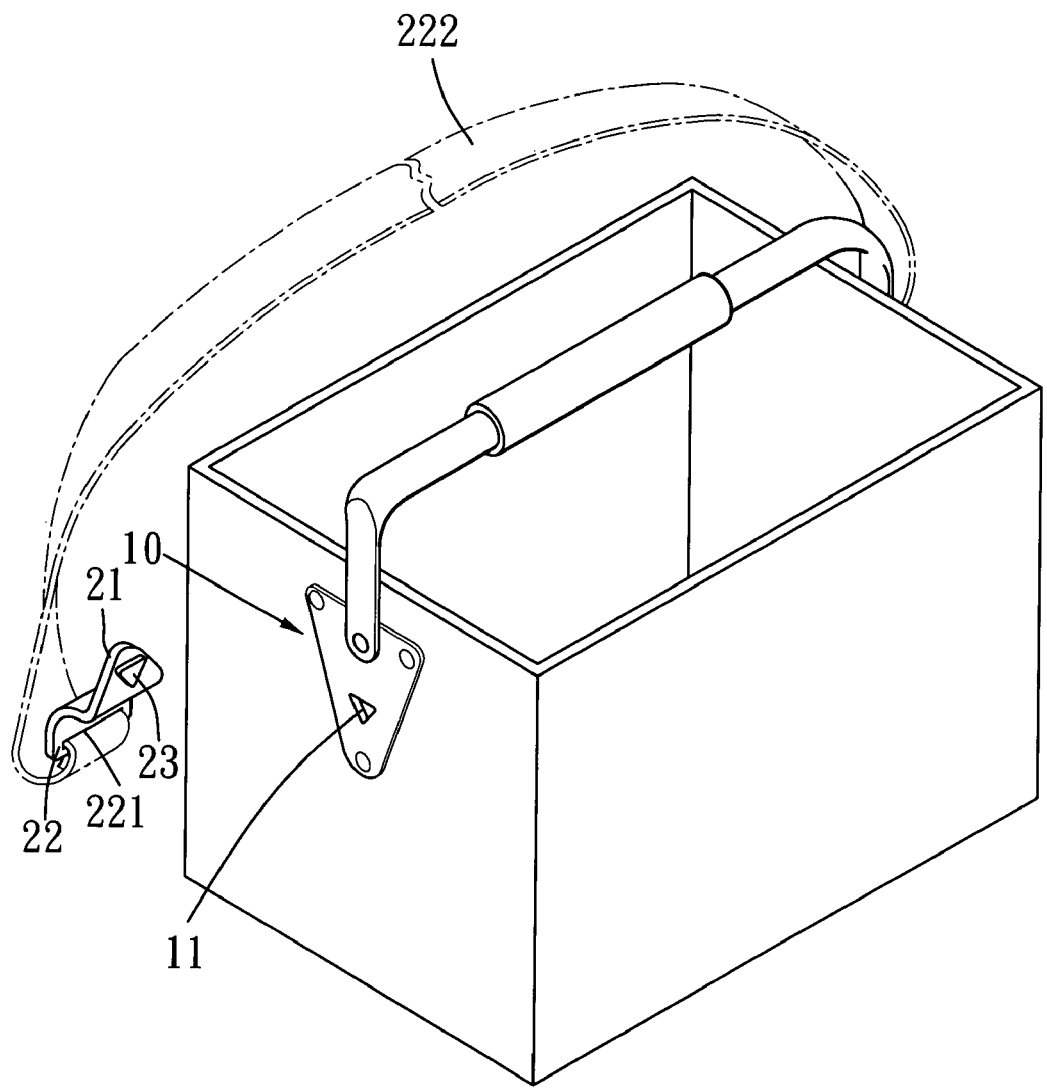
FIG. 9 is a perspective view showing the another application mode of the present invention before connecting.
Figure 10:
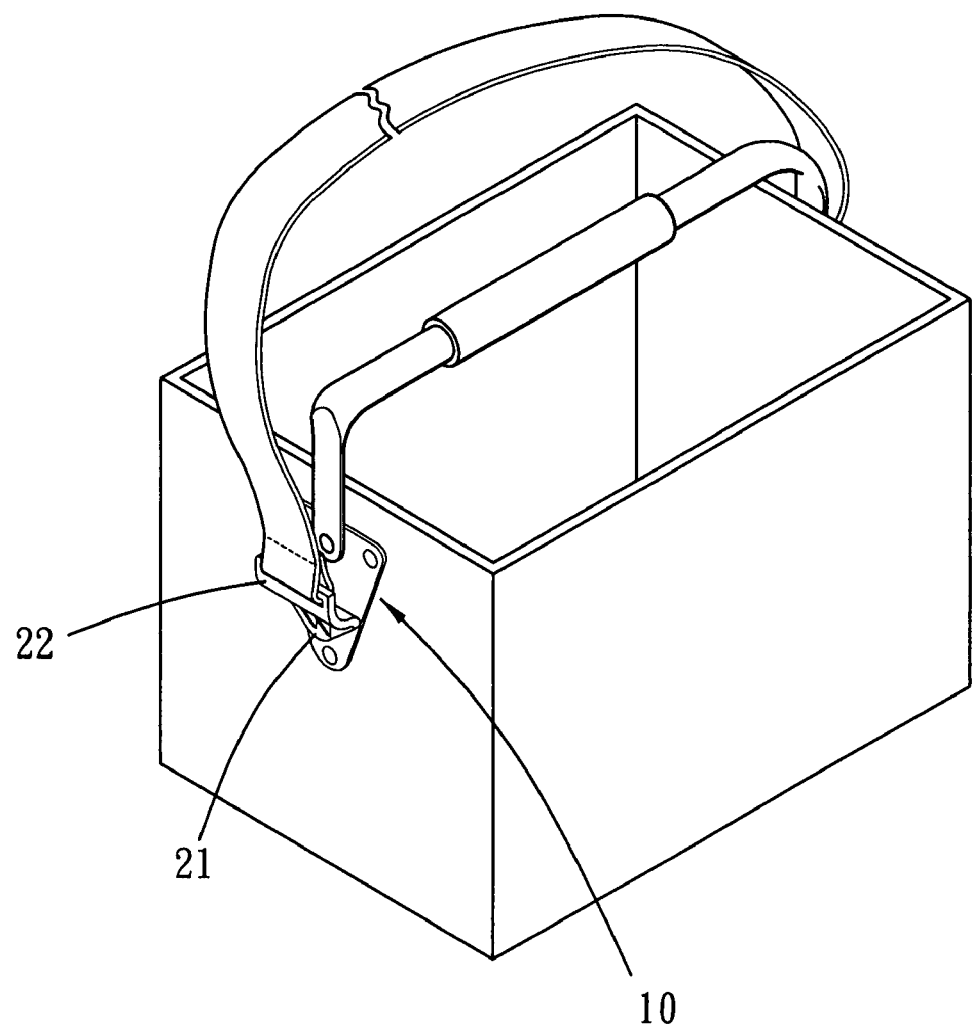
FIG. 10 is a perspective view showing the another application mode of the present invention after connecting.

Besides, as shown in FIGS. 9 and 10, it is an example showing the invention is applied on a tool box with a detachable hanging strap. Two sets of this invention are mounted on this tool box. Each hanger 22 of the detachable part 20 is disposed with a detachable hanging strap hole 221 (as illustrated in FIG. 8) for engaging with this detachable hanging strap 222. Let the locking portion 23 of the detachable part 20 insert into the first through hole 111, as illustrated in FIG. 9. After inserting into this first through 11, the user should rotate a certain angle so that it will be locked on. Finally, the detachable hanging strap 222 will be secured on this too box easily and quickly as shown in FIG. 10 (which shows a locking state).

The advantages and functions of the present invention can be summarized as follows.

[1] It is easy to manufacture with low cost. This invention consists of the base and the detachable part. Furthermore, the first pressed plate, the second pressed plate, and the auxiliary frame can be made by a pressing machine or by a mold injection method (such injection product has a very solid structure). Also, the detachable part can be produced by a mold injection method. Therefore, this invention is suitable for mass production. It is easy to be manufactured with low cost.

[2] The connected structure is quite solid. The detachable part finally stays in the space of the second through hole and is locked by the edge of the first through hole. So, it can quick-connect or quick-release. In addition, the connect structure is quite solid.

[3] Its application scope is wide. This quick-release design improves the easy of use about this invention. Plus, the connected structure is pretty solid. It can be applied to various fields and products that needs such quick-release design, especially for tool container related applications. Thus, its application scope is wide.

The above embodiments are only used to illustrate the present invention, not intended to limit the scope thereof. Many modifications of the above embodiments can be made without departing from the spirit of the present invention.

What is claimed is:

1. A quick-release hanging device comprising:
    a base including a first through hole and a second through hole, said first through hole being a first regular polygonal shape, said second through hole being a substantially round shape, said base including a first pressed plate, a second pressed plate, an auxiliary frame, an application connecting hole, and a plurality of fixing assemblies, said first through hole being formed on said first pressed plate, said second through hole being formed on said second pressed plate and said auxiliary frame; and
    a detachable part including a movable portion, a hanger and a locking portion, said locking portion being a second regular polygonal shape which is relative smaller than and corresponding to said first regular polygonal shape, said locking portion is rotatable within said second through hole.

2. The quick-release hanging device as claimed in claim 1, wherein said application connecting hole connects with an application object, said application object is selected from one of a belt, a suspending element and a tool container 3. A quick-release hanging device comprising:
    a base including a first through hole and a second through hole, said first through hole being a first regular polygonal shape, said second through hole being a substantially round shape; and
    a detachable part including a movable portion, a hanger and a locking portion; said locking portion being a second regular polygonal shape which is relative smaller than and corresponding to said first regular polygonal shape, said locking portion is rotatable within said second through hole, said locking portion being pivoted on said movable portion and permits rotation to a predetermined angle.

* * * * *